United States Patent

Kabashima

(10) Patent No.: US 12,335,630 B2
(45) Date of Patent: Jun. 17, 2025

(54) PHYSICAL BODY INSPECTION SYSTEM AND DISPLAY CONTROL METHOD

(71) Applicant: TOYOTA PRODUCTION ENGINEERING, Munakata (JP)

(72) Inventor: Haruki Kabashima, Munakata (JP)

(73) Assignee: TOYOTA PRODUCTION ENGINEERING, Munakata (JP)

(*) Notice: Subject to any disclaimer, the term of this patent is extended or adjusted under 35 U.S.C. 154(b) by 211 days.

(21) Appl. No.: 18/166,772

(22) Filed: Feb. 9, 2023

(65) Prior Publication Data

US 2023/0262341 A1 Aug. 17, 2023

(30) Foreign Application Priority Data

Feb. 15, 2022 (JP) ................................ 2022-021085

(51) Int. Cl.
| | |
|---|---|
| H04N 23/74 | (2023.01) |
| G01J 3/28 | (2006.01) |
| G01N 21/88 | (2006.01) |
| H04N 23/71 | (2023.01) |

(52) U.S. Cl.
CPC ............ H04N 23/74 (2023.01); G01J 3/2823 (2013.01); G01N 21/8806 (2013.01); G01N 21/8851 (2013.01); H04N 23/71 (2023.01); *G01N 2021/8845* (2013.01)

(58) Field of Classification Search
CPC ....... H04N 23/74; H04N 23/71; G01J 3/2823; G01N 21/8806; G01N 21/8851; G01N 2021/8845
See application file for complete search history.

(56) References Cited

U.S. PATENT DOCUMENTS

| | | | |
|---|---|---|---|
| 2013/0208120 A1 | 8/2013 | Hirai et al. | |
| 2017/0010153 A1* | 1/2017 | Vezard | G01J 3/0291 |
| 2017/0320434 A1 | 11/2017 | Sato et al. | |
| 2021/0033589 A1* | 2/2021 | Tufillaro | G01J 3/0289 |
| 2023/0141957 A1* | 5/2023 | Lee | G01N 21/94 |
| | | | 356/237.1 |
| 2023/0254598 A1* | 8/2023 | Thuresson | H04N 23/667 |
| | | | 348/164 |

FOREIGN PATENT DOCUMENTS

| | | | |
|---|---|---|---|
| EP | 2391118 A1 * | 11/2011 | ............ G03B 15/05 |
| JP | 2005-351678 A | 12/2005 | |
| JP | 2013-190416 A | 9/2013 | |
| JP | 6322723 B2 | 5/2018 | |
| JP | 2018-189564 A | 11/2018 | |
| JP | 2020-506369 A | 2/2020 | |
| WO | 2018/111499 A1 | 6/2018 | |

* cited by examiner

*Primary Examiner* — Tarifur R Chowdhury
*Assistant Examiner* — Carlos Perez-Guzman
(74) *Attorney, Agent, or Firm* — Oliff PLC

(57) ABSTRACT

A physical body inspection system includes a light source device, an image pickup device and a display. The light source device is configured to apply light in a predetermined wavelength band to a physical body, the physical body being an inspection object, the predetermined wavelength band being a wavelength band in wavelength bands constituting environment light at an inspection time-of-day, and the light in the predetermined wavelength band being low in intensity. The inspection time-of-day is a time of day when the physical body is inspected. The image pickup device is configured to pick up an image of the physical body. The display is configured to display the picked-up image of the physical body.

6 Claims, 11 Drawing Sheets

PHYSICAL BODY INSPECTION SYSTEM AND DISPLAY CONTROL METHOD

CROSS-REFERENCE TO RELATED APPLICATION

This application claims priority to Japanese Patent Application No. 2022-021085 filed on Feb. 15, 2022, incorporated herein by reference in its entirety.

BACKGROUND

1. Technical Field

The present disclosure relates to a physical body inspection system and a display control method.

2. Description of Related Art

In the inspection of a physical body in a factory or the like, there is known a technology in which a picked-up image of the physical body is displayed on a display device and in which an inspector inspects the physical body while looking at the image. In this technology, when environment light such as illumination and sunlight is changed, pixel values of pixels constituting the image are varied, and the physical body cannot be visually recognized, in some cases.

Therefore, Japanese Patent No. 6322723 discloses an image pickup element that corresponds to the pixels and in which at least one kind of color filter and a specific filter to transmit a specific wavelength range having a lower spectral irradiance of solar light than adjacent wavelength regions on both sides are disposed on a light receiving surface, and an image pickup device that detects an application state of a specific light source different from solar light applied to an image pickup range of the image pickup element, based on a signal component that is of an image signal acquired from the image pickup element and that is generated by a pixel for which the specific filter is disposed. Thereby, it is possible to reduce the influence of solar light, even when the irradiance of solar light is high.

SUMMARY

However, although the specific wavelength region in which the spectral irradiance of solar light is low is used in Japanese Patent No. 6322723, solar light, an illumination and a sensor are mixed indoors and the state of light sources changes by time of day. Therefore, a proper image cannot be always acquired even when the specific wavelength region in which the spectral irradiance of solar light is low is used.

In other words, in the case where the inspection of the physical body is performed in the factory or the like, it is necessary to reduce the influence of environment light over all times of day when the inspection is performed. Therefore, in the case where the inspection of the physical body is performed in the factory or the like, an importance issue is to efficiently reduce the influence of environment light.

The present disclosure provides a physical body inspection system and a display control method that make it possible to efficiently reduce the influence of environment light in the case where the inspection of the physical body is performed in the factory or the like.

A physical body inspection system according to a first aspect of the present disclosure includes a light source device, an image pickup device and a display. The light source device is configured to apply light in a predetermined wavelength band to a physical body, the physical body being an inspection object, the predetermined wavelength band being a wavelength band in wavelength bands constituting environment light at an inspection time-of-day, and the light in the predetermined wavelength band being low in intensity. The inspection time-of-day is a time of day when the physical body is inspected. The image pickup device is configured to pick up an image of the physical body. The display is configured to display the picked-up image of the physical body.

Further, the physical body inspection system according to the first aspect of the present disclosure may further include a processor. The processor may be configured to identify the predetermined wavelength band, and may be configured to control the light source device such that the light source device applies the light in the identified predetermined wavelength band to the physical body.

Further, in the physical body inspection system according to the first aspect of the present disclosure, the processor may be configured to acquire the intensity for each of the wavelength bands constituting the environment light, and may be configured to identify the predetermined wavelength band based on the intensity for each of the wavelength bands.

Further, in the physical body inspection system according to the first aspect of the present disclosure, the light source device may include a white light source configured to emit white light, and a first filter configured to transmit the light in the predetermined wavelength band in wavelength bands constituting the white light, the predetermined wavelength band being identified by the processor.

Further, in the physical body inspection system according to the first aspect of the present disclosure, the image pickup device may include a second filter configured to transmit the light in the predetermined wavelength band in the wavelength bands constituting the white light, the predetermined wavelength band being identified by the processor.

Further, in the physical body inspection system according to the first aspect of the present disclosure, each of the first filter and the second filter may include a plurality of optical filters each of which is configured to transmit light in a specific wavelength band. The processor may be configured to automatically select an optical filter configured to transmit the light in the identified predetermined wavelength band, from the plurality of optical filters.

Further, in the physical body inspection system according to the first aspect of the present disclosure, the light source device may be configured to apply the light in the predetermined wavelength band to a predetermined region in a spotted manner, the light in the predetermined wavelength band being included in the light emitted from the white light source.

Further, a display control method according to a second aspect of the present disclosure is a display control method in a physical body inspection system including: an image pickup device configured to pick up an image of a physical body, the physical body being an inspection object; and a predetermined display unit configured to display the image of the physical body that is picked up by the image pickup device. The display control method includes applying, by a light source device, light in a predetermined wavelength band to the physical body, the predetermined wavelength band being a wavelength band in wavelength bands constituting environment light at an inspection time-of-day, the light in the predetermined wavelength band being low in intensity, and the inspection time-of-day being a time of day when the physical body is inspected; and picking up the image of the physical body by the image pickup device.

According to the present disclosure, it is possible to efficiently reduce the influence of environment light in the case where the inspection of the physical body is performed in the factory or the like.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of a physical body inspection system and a display control method according to the present disclosure will be described below in detail based on the drawings.

Embodiment 1

Outline of Physical Body Inspection System

Figure 1A:
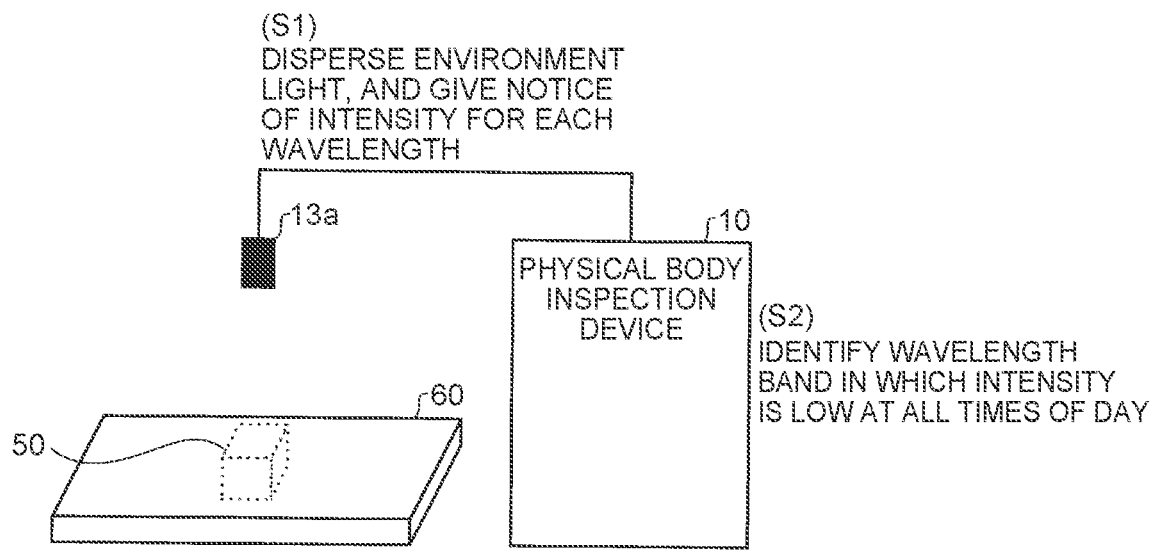
FIG. 1A is a diagram showing the outline of a physical body inspection system according to an embodiment 1.
Figure 1B:
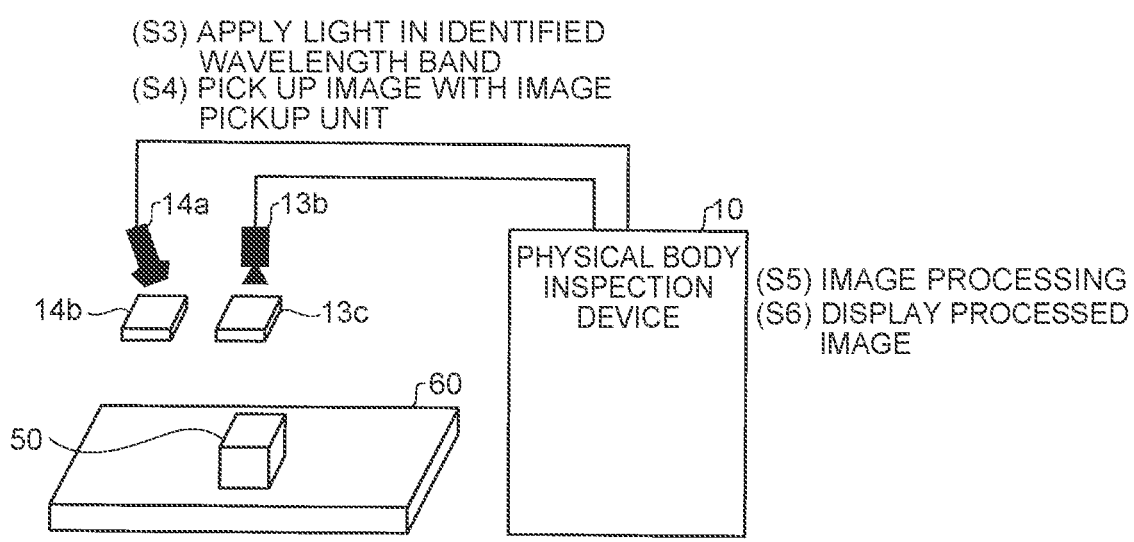
FIG. 1B is a diagram showing the outline of the physical body inspection system according to the embodiment 1.

First, the outline of a physical body inspection system according to an embodiment 1 will be described. FIG. 1A and FIG. 1B are diagrams showing the outline of the physical inspection system according to the embodiment 1.

As shown in FIG. 1A, the physical body inspection system performs a process of identifying the wavelength of the light applied from a light source device 14 in advance. Specifically, a spectroscopic unit 13a is provided above an inspection table 60, and the spectroscopic unit 13a disperses environment light (including solar light and illumination light) on the inspection table 60, and gives notice of an intensity for each wavelength to a physical body inspection device 10 (S1). Then, when the physical body inspection device 10 receives the notice of the intensity for each wavelength of the environment light at a plurality of times of day, the physical body inspection device 10 identifies a wavelength band including a wavelength for which the intensity is lowest at all times of day (S2). In this way, the wavelength band of the light applied from the light source device 14 is identified in advance. For example, the wavelength band of the light applied from the light source device 14 is identified, using the intensity for each wavelength of the environment light at respective predetermined hours during morning, evening and night.

When the inspection of a physical body is performed, as shown in FIG. 1, the physical body inspection device 10 arranges a filter 14b that transmits the light in the identified wavelength band and that does not transmit the light in the wavelength band other than the identified wavelength band. Then, the light that is of the light emitted by a white light source 14a and that is transmitted by the filter 14b is applied to a physical body 50 (S3).

Further, a filter 13c is arranged between the physical body 50 and an image pickup unit 13b. Similarly to the filter 14b, the filter 13c is a filter that transmits the light in the identified wavelength band and that does not transmit the light in the wavelength band other than the identified wavelength band. Therefore, the image pickup unit 13b picks up an image of the physical body 50 based on the light in the identified wavelength band (S4).

Then, the physical body inspection device 10 performs image processing to the image picked up by the image pickup unit 13b (S5). Specifically, differential processing is performed to the image in an X direction and a Y direction, and luminance gradients are evaluated. Then, the pixel values of pixels having luminance gradients less than a predetermined threshold are set to a predetermined value (for example, "0"), and thereby the luminance gradients of the pixels are eliminated. A display unit 11 is controlled so as to display the image after the image processing (S6).

Configuration of Physical Body Inspection Device 10

Figure 2:
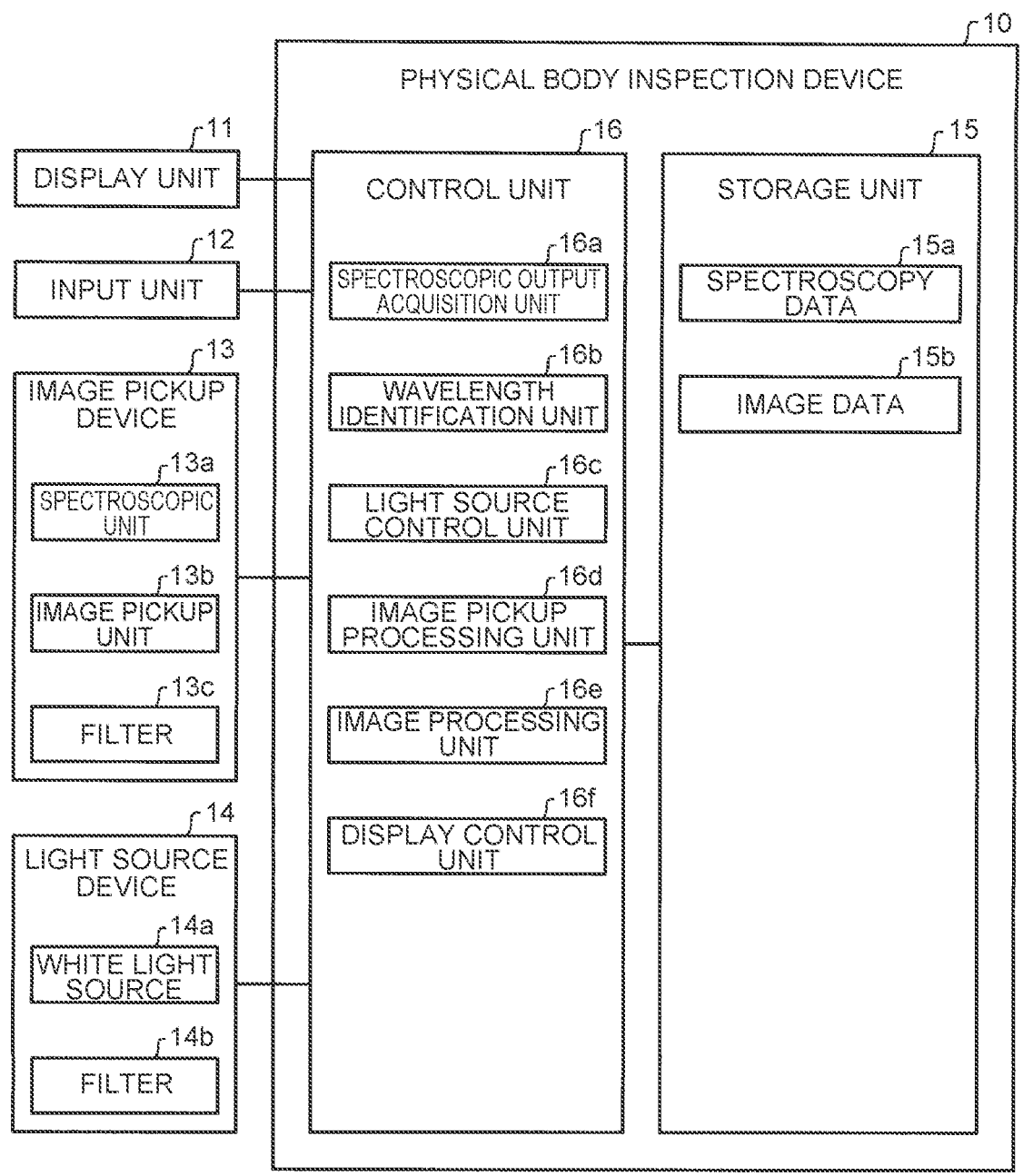
FIG. 2 is a functional block diagram showing the configuration of a physical body inspection device shown in FIG. 1A and FIG. 1B.

Next, the configuration of the physical body inspection device 10 show in FIG. 1A and FIG. 1B will be described. FIG. 2 is a functional block diagram showing the configuration of the physical body inspection device 10 shown in FIG. 1A and FIG. 1B. As shown in FIG. 2, the physical body inspection device 10 includes a storage unit 15 and a control unit 16, and is connected with the display unit 11, an input unit 12, an image pickup device 13 and the light source device 14. The display unit 11 is a display device that displays a variety of information, as exemplified by a liquid crystal display. The input unit 12 is an input device such as a mouse and a keyboard.

The image pickup device 13 includes the spectroscopic unit 13a, the image pickup unit 13b and the filter 13c. The spectroscopic unit 13a is a device that measures the intensity for each wavelength of the environment light on the inspection table 60. The spectroscopic unit 13a performs spectroscopy with a prism or spectroscopy with a diffraction grating. The image pickup unit 13b is a camera that picks up the image of the physical body 50. The filter 13c is an optical filter that transmits the light in a specific wavelength band and that does not transmit the light in the wavelength band other than the specific wavelength band.

The light source device 14 includes the white light source 14a and the filter 14b. The white light source 14a is a light source that applies the light including lights in wavelength bands for ultraviolet light, visible light and infrared light. As the white light source 14a, for example, an LED can be used.

An electric-discharge lamp (a mercury lamp, a heavy hydrogen lamp, a tungsten lamp, a xenon lamp, or the like), or a laser excitation white light source may be used. The filter 14b is an optical filter that transmits the light in a specific wavelength band and that does not transmit the light in the wavelength band other than the specific wavelength band. The optical filter can be produced using an ion assisted deposition multiplayer film, a sputtering multiplayer film or the like. The light source device 14 may be a light source that can directly apply the light in a specific wavelength band.

The storage unit 15 is a storage device such as a hard disk device and a non-volatile memory, and stores spectroscopy data 15a and image data 15b. The spectroscopy data 15a is data in which the wavelength and intensity of the environment light that are measured by the spectroscopic unit 13a at a predetermined hour are associated. The image data 15b is image data picked up by the image pickup unit 13b of the image pickup device 13 through the filter 13c that transmits the light in a specific wavelength band and that does not transmit the light in the wavelength band other than the specific wavelength band.

The control unit 16 is a control unit that controls the whole of the physical body inspection device 10, and includes a spectroscopic output acquisition unit 16a, a wavelength identification unit 16b, a light source control unit 16c, an image pickup processing unit 16d, an image processing unit 16e and a display control unit 16f. In practice, a CPU loads and executes programs for these units, and thereby executes processes respectively corresponding to the spectroscopic output acquisition unit 16a, the wavelength identification unit 16b, the light source control unit 16c, the image pickup processing unit 16d, the image processing unit 16e and the display control unit 16f.

The spectroscopic output acquisition unit 16a is a processing unit that measures the environment light on the inspection table 60 by controlling the spectroscopic unit 13a, that acquires the spectroscopy data output from the spectroscopic unit 13a, and that stores the acquired spectroscopy data as the spectroscopy data 15a. For example, the spectroscopic output acquisition unit 16a acquires the spectroscopy data 15a at times of day for morning, evening and night.

The wavelength identification unit 16b is a processing unit that identifies a wavelength band in which the intensity of the light is equal to or lower than a predetermined threshold at all times of day, from the spectroscopy data 15a at the times of day that is acquired by the spectroscopic output acquisition unit 16a.

The light source control unit 16c is a control unit that performs an on-off control of the white light source 14a of the light source device 14 for picking up the image of the physical body 50 placed on the inspection table 60. The filter 14b of the light source device 14 is a filter that transmits the light in the wavelength band identified by the wavelength identification unit 16b and that does not transmit the light in the wavelength band other than the identified wavelength band. For the filter 14b, an operator selects a filter matching the identified wavelength band, from a plurality of filters, and sets the selected filter.

The image pickup processing unit 16d is a processing unit that controls the image pickup unit 13b such that the image pickup unit 13b picks up the image of the physical body 50 placed on the inspection table 60, after the light is applied from the light source device 14. The filter 13c is a filter that transmits the light in the wavelength band identified by the wavelength identification unit 16b and that does not transmit the light in the wavelength band other than the identified wavelength band. For the filter 13c, the operator selects a filter matching the identified wavelength band, from a plurality of filters, and sets the selected filter.

The image processing unit 16e is a processing unit that performs image processing for visualizing and displaying the physical body 50, and performs (1) noise removal, (2) differential processing, (3) luminance gradient calculation, (4) threshold processing, and the like. In (1) noise removal, a known integral processing and smoothing processing, and the like are performed. In (2) differential processing, for example, a SOBEL filter in the X direction and the Y direction can be used. In (3) luminance gradient calculation, luminance gradients can be evaluated using pixel values of a differential image in the X direction and a differential image in the Y direction. When the luminance gradient of each pixel is evaluated, an average value of a pixel value x of the differential image in the X direction and a pixel value y of a corresponding position in the Y direction, or the like can be merely used. The display control unit 16f is a processing unit that controls the display unit 11 such that the display unit 11 displays the image processed by the image processing unit 16e.

Identification of Wavelength Band

Figure 3:
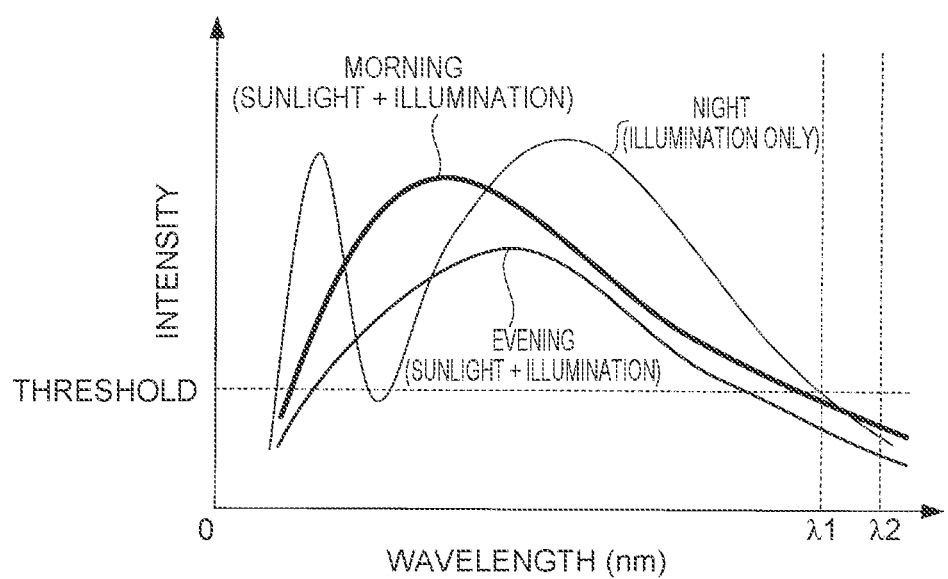
FIG. 3 is an explanatory diagram for describing the identification of a wavelength band by the physical body inspection device shown in FIG. 2.

Next, the identification of the wavelength band by the physical body inspection device 10 shown in FIG. 2 will be described. FIG. 3 is an explanatory diagram for describing the identification of the wavelength band by the physical body inspection device 10 shown in FIG. 2. An example in which the measurement is performed three times, at morning, evening and night, will be shown. As shown in FIG. 3, in the physical body inspection device 10, the spectroscopic output acquisition unit 16a acquires the intensity for each wavelength of the environment light from the spectroscopic unit 13a. The environment light includes sunlight and illumination light at a time of day for morning, includes sunlight and illumination light at a time of day for evening, and includes illumination light at a time of day for night. It is assumed that the illumination light is the light of an indoor lamp in a room, a factory or the like.

For example, when the measurement at the times of day for morning, evening and night is completed, a wavelength region in which the intensity for the wavelength is equal to or lower than the threshold at all times of day when the measurement is performed is identified. In the example of FIG. 3, the region in which the intensity is lower than the threshold at all times of day: the time of day for morning, the time of day for evening and the time of day for night is a region in which the wavelength is longer than λ1. Therefore, the wavelength identification unit 16b identifies the wavelength band of the light to be applied from the light source device 14 to the physical body 50, as a wavelength band in which the wavelength is longer than λ1 and is shorter than λ2, for example.

Processing Procedure for Identifying Wavelength Band of Light in Physical Body Inspection Device 10

Figure 4:
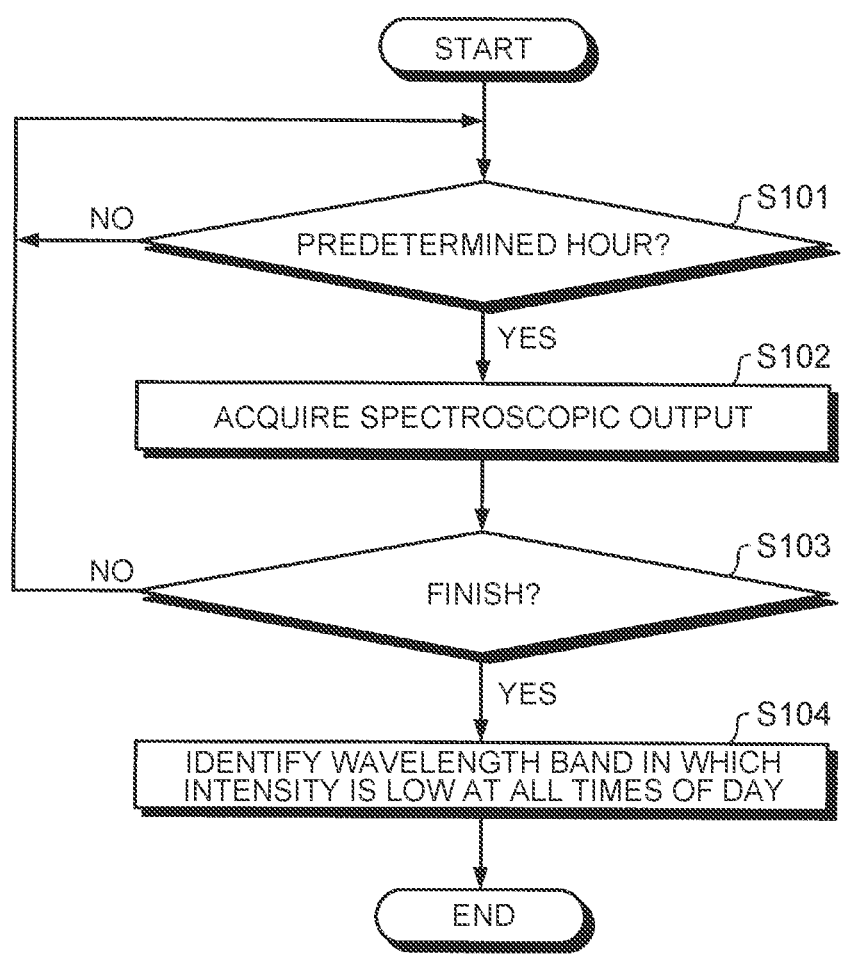
FIG. 4 is a flowchart showing an identification procedure for the wavelength band by the physical body inspection device shown in FIG. 2.

Next, an identification procedure for the wavelength band by the physical body inspection device 10 will be described. FIG. 4 is a flowchart showing the identification procedure for the wavelength band by the physical body inspection device 10 shown in FIG. 2. As shown in FIG. 4, the physical body inspection device 10 waits until a predetermined hour (step S101; No). For example, in the case of morning, the predetermined hour is nine o'clock.

At the predetermined hour (step S101; Yes), the physical body inspection device 10 acquires the spectroscopic output of the spectroscopic unit 13a (step S102). Thereafter, when the measurement is not finished (step S103; No), the physical body inspection device 10 transitions to step S101, and waits until the next predetermined hour. When the measurement is finished (step S103; Yes), the physical body inspection device 10 identifies the wavelength band in which the intensity is equal to or lower than the threshold at all times of day (step S104), and ends the process.

Display Control Procedure by Physical Body Inspection Device 10

Figure 5:
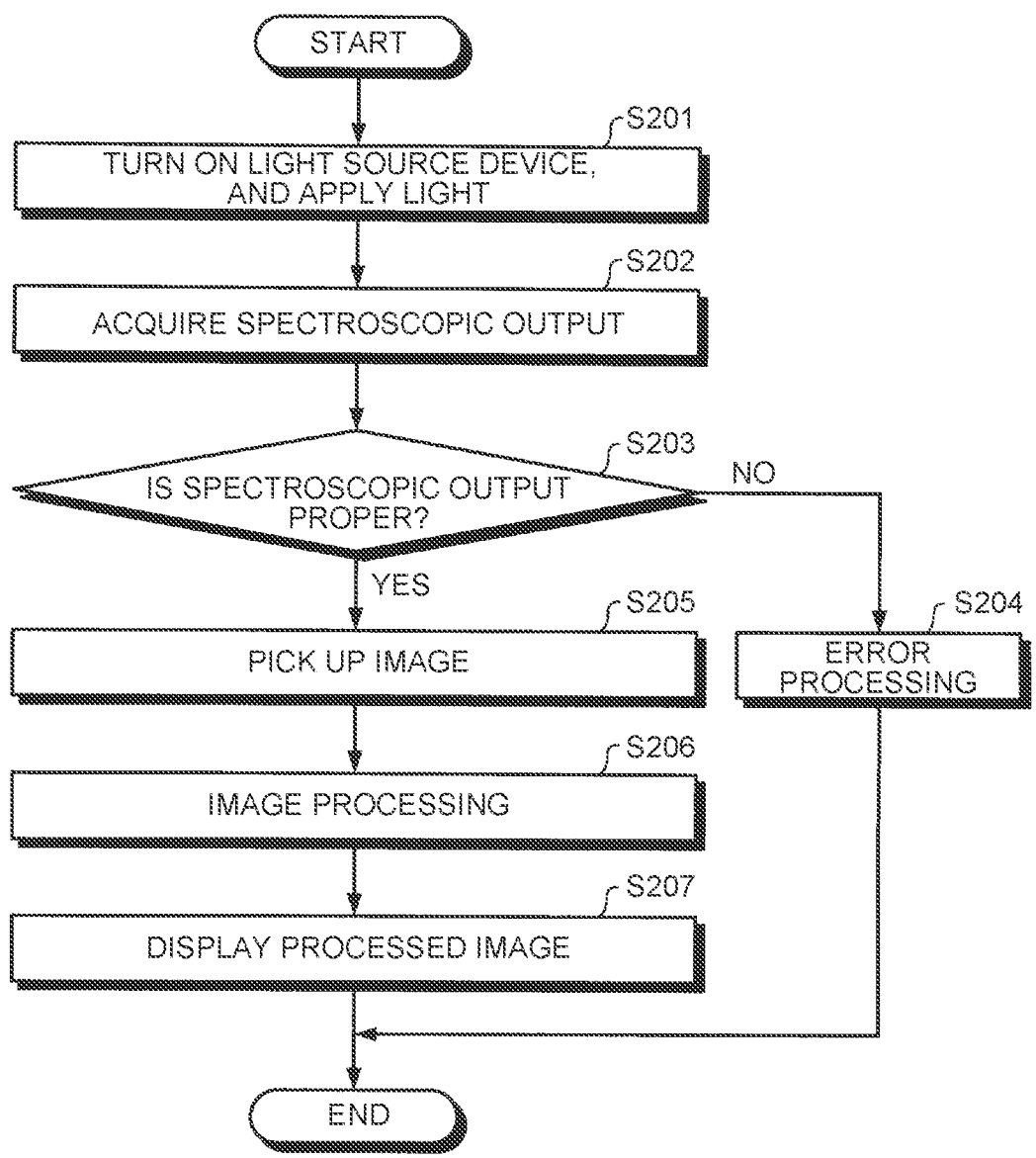
FIG. 5 is a flowchart showing a display control procedure by the physical body inspection device shown in FIG. 2.

Next, a display control procedure by the physical body inspection device 10 will be described. FIG. 5 is a flowchart showing the display control procedure by the physical body inspection device 10 shown in FIG. 2. As each of the filter 13c of the image pickup device 13 and the filter 14b of the light source device 14, a filter that transmits the light in a specific wavelength band is previously arranged.

As shown in FIG. 5, the physical body inspection device 10 turns on the white light source 14a of the light source device 14, and applies white light (step S201). The white light includes lights having various wavelengths. However, the filter 14b transmits lights in the specific wavelength band and does not transmit lights in the wavelength band other than the specific wavelength band, and the light transmitted by the filter 14b is applied to the physical body 50.

The physical body inspection device 10 acquires the spectroscopic output from the spectroscopic unit 13a, for confirming that the light applied to the physical body 50 satisfies the specific wavelength band and the intensity (step S202). Thereafter, the physical body inspection device 10 determines whether the measured spectroscopic output is proper. Specifically, in the case of the specific wavelength band, it is determined that the spectroscopic output is proper.

In the case where it is determined that the spectroscopic output is not proper (step S203; No), error processing is performed (step S204), and the process is ended. As the error processing, for example, on the display unit 11, characters such as "white light source error" may be displayed, or an error code may be displayed.

On the other hand, in the case where it is determined that the spectroscopic output is proper (step S203; Yes), the image of the physical body 50 placed on the inspection table 60 is picked up (step S205).

Then, the physical body inspection device 10 performs the image processing such as the noise removal, the differential processing, the luminance gradient calculation and the threshold processing (step S206), controls the display unit 11 such that the display unit 11 displays the processed image (step S207), and ends the process.

Processed Image for which Specific Wavelength Band is Used

Figure 6A:
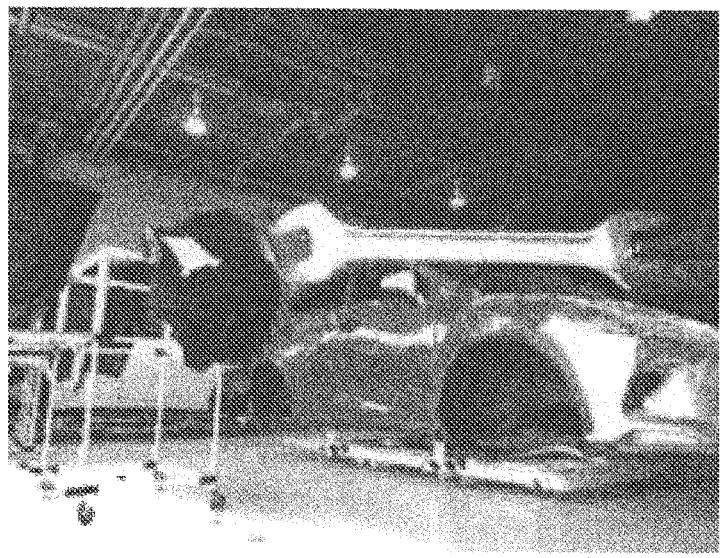
FIG. 6A is a diagram showing an example of a visible light image.
Figure 6B:
FIG. 6B is a diagram showing an example of a processed image for which light in a specific wavelength band is used.

Next, an example of a processed image for which the light in the specific wavelength band is used will be described. FIG. 6A and FIG. 6B are diagrams showing examples of a visible light image and the processed image for which the light in the specific wavelength band is used. As shown in FIG. 6A, the visible light image is an image that includes also various physical bodies in the background. On the other hand, as shown in FIG. 6B, the image picked up by identifying the wavelength band in which the intensity of the light is low at all times of day and applying the light in the identified wavelength band is an image that includes the physical body 50 and in which a background portion is removed.

As described above, in the embodiment 1, the physical body inspection device 10 measures the environment light in a predetermined period with the spectroscopic unit 13a, identifies the wavelength band in which the intensity of the light is equal to or lower than the predetermined threshold at all times of day, applies the light in the identified wavelength band to the physical body 50 through the filter 14b that transmits the light in the identified wavelength band and that does not transmit the light in the wavelength band other than the identified wavelength band, and picks up the light reflected from the physical body 50 through the filter 13c that transmits the light in the identified wavelength band and that does not transmit the light in the wavelength band other than the identified wavelength band, with the image pickup unit 13b. Thereby, it is possible to efficiently reduce the influence of the environment light in the case where the inspection of the physical body is performed in the factory or the like.

Embodiment 2

In the above embodiment 1, the case where the filter that transmits the light in a specific wavelength band and that does not transmit the light in the wavelength band other than the specific wavelength band is previously set by the operator, where the light in the specific wavelength band is applied from the white light source 14a, and where the light in the specific wavelength band is picked up by the image pickup unit 13b has been described. In an embodiment 2, a case where each of an image pickup device 23 and a light source device 24 includes a plurality of filters each of which transmits the light in a specific wavelength band and each of which does not transmit the light in the wavelength band other than the specific wavelength band and where the control unit automatically selects a filter will be described. The same sites as sites in the embodiment 1 are denoted by the same reference characters, and detailed descriptions of the sites are omitted.

Outline of Physical Body Inspection System

Figure 7:
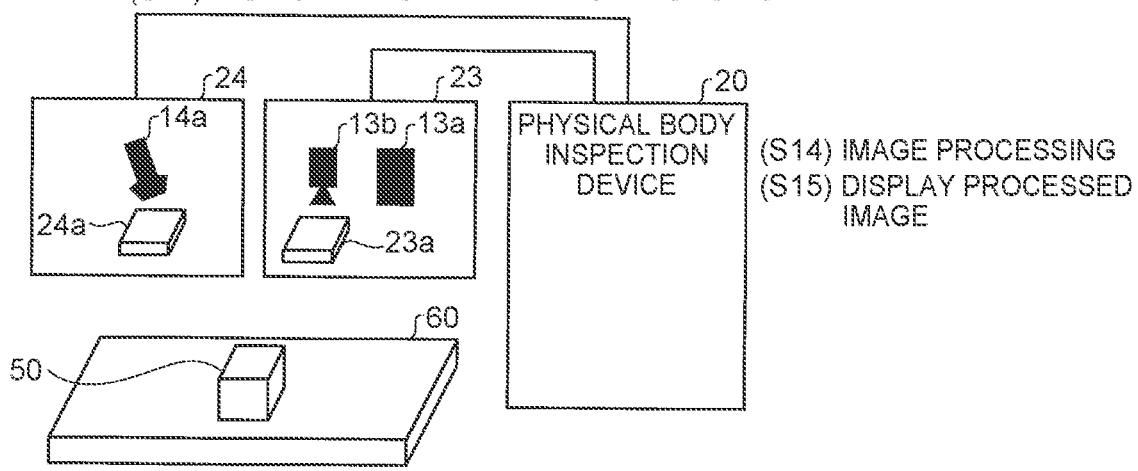
FIG. 7 is a diagram showing the outline of a physical body inspection system according to an embodiment 2.

Next, the outline of a physical body inspection system according to the embodiment 2 will be described. FIG. 7 is a diagram showing the outline of the physical body inspection system according to the embodiment 2. It is assumed that a physical body inspection device 20 has identified the wavelength band in which the intensity of the light is equal to or lower than the predetermined threshold at all times of day.

As shown in FIG. 7, the physical body inspection device 20 arranges a variable filter 23a between the physical body 50 and the image pickup unit 13b. The variable filter 23a is constituted by a plurality of filters each of which transmits the light in a specific wavelength band and each of which does not transmit the light in the wavelength band other than the specific wavelength band. Further, a variable filter 24a is arranged between the physical body 50 and the white light source 14a. Similarly to the variable filter 23a, the variable filter 24a is constituted by a plurality of filters each of which transmits the light in a specific wavelength band and each of which does not transmit the light in the wavelength band other than the specific wavelength band. After the physical body inspection device 20 identifies the wavelength band in which the intensity of the light is equal to or lower than the predetermined threshold at all times of day, the physical body inspection device 20 selects a filter that transmit the light in the identified wavelength band and that does not transmit the light in the wavelength band other than the identified wavelength band, from the filters of the variable filters 23a, 24a (S11).

Then, the physical body inspection device 20 applies the light that is of the light emitted from the white light source 14a of the light source device 24 and that is transmitted by the variable filter 24a, to the physical body 50 (S12). With the image pickup unit 13b, the physical body inspection device 20 picks up the image of the light reflected from the physical body 50, through the variable filter 23a with the selected filter that transmits the light in the identified wavelength band and that does not transmit the light in the wavelength band other than the identified wavelength band (S13).

Then, the physical body inspection device 20 performs image processing to the image picked up by the image pickup unit 13b (S14). Specifically, differential processing is performed to the image in the X direction and the Y direction, and luminance gradients are evaluated. Then, the pixel values of pixels having luminance gradients less than a predetermined threshold are set to a predetermined value (for example, "0"), and thereby the luminance gradients of the pixels are eliminated. The display unit 11 is controlled so as to display the image after the image processing (S15).

Configuration of Physical Body Inspection Device 20

Figure 8:
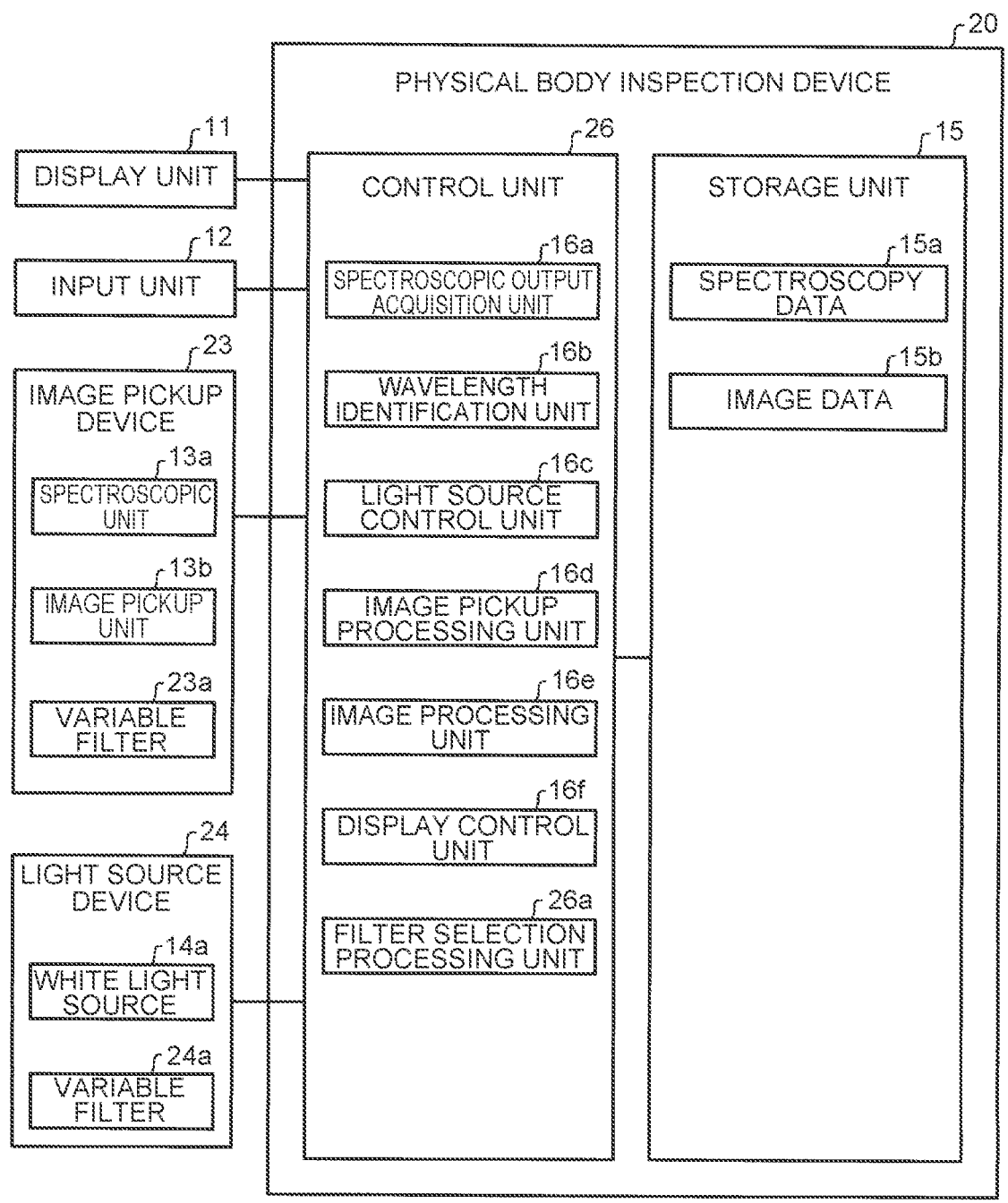
FIG. 8 is a functional block diagram showing the configuration of a physical body inspection device shown in FIG. 7.

Next, the configuration of the physical body inspection device 20 shown in FIG. 7 will be described. FIG. 8 is a functional block diagram showing the configuration of the physical body inspection device 20 shown in FIG. 7. As shown in FIG. 8, the physical body inspection device 20 includes the storage unit 15 and a control unit 26, and is connected with the display unit 11, the input unit 12, the image pickup device 23 and the light source device 24.

The image pickup device 23 includes the spectroscopic unit 13a, the image pickup unit 13b and the variable filter 23a. The variable filter 23a is constituted by a plurality of optical filters each of which transmits the light in a specific wavelength band and each of which does not transmit the light in the wavelength band other than the specific wavelength band. The optical filters are attached to a circular or linear metallic part that holds the optical filters, and the metallic part is moved by a motor or the like. Thereby, the wavelength band of the light to be transmitted can be varied.

The light source device 24 includes the white light source 14a and the variable filter 24a. The variable filter 24a is constituted by a plurality of optical filters each of which transmits the light in a specific wavelength band and each of which does not transmit the light in the wavelength band other than the specific wavelength band. The optical filters are attached to a circular or linear metallic part that holds the optical filters, and the metallic part is moved by a motor or the like. Thereby, the wavelength band of the light to be transmitted can be varied.

The control unit 26 is a control unit that controls the whole of the physical body inspection device 20, and includes the spectroscopic output acquisition unit 16a, the wavelength identification unit 16b, the light source control unit 16c, the image pickup processing unit 16d, the image processing unit 16e, the display control unit 16f, and a filter selection processing unit 26a. In practice, a CPU loads and executes programs for these units, and thereby executes processes respectively corresponding to the spectroscopic output acquisition unit 16a, the wavelength identification unit 16b, the light source control unit 16c, the image pickup processing unit 16d, the image processing unit 16e, the display control unit 16f and the filter selection processing unit 26a.

In response to the wavelength band of the light identified by the wavelength identification unit 16b, the filter selection processing unit 26a performs a process of selecting a filter that transmits the light in the identified wavelength band and that does not transmit the light in the wavelength band other than the identified wavelength band, from the plurality of optical filters arranged in each of the variable filter 23a and the variable filter 24a. Specifically, after the wavelength band of the light is identified by the wavelength identification unit 16b, a notice of a signal for selecting the filter that transmits the light in the identified wavelength band and that does not transmit the light in the wavelength band other than the identified wavelength band is given to the variable filter 23a of the image pickup device 23 and the variable filter 24a of the light source device 24.

Display Control Procedure by Physical Body Inspection Device 20

Figure 9:
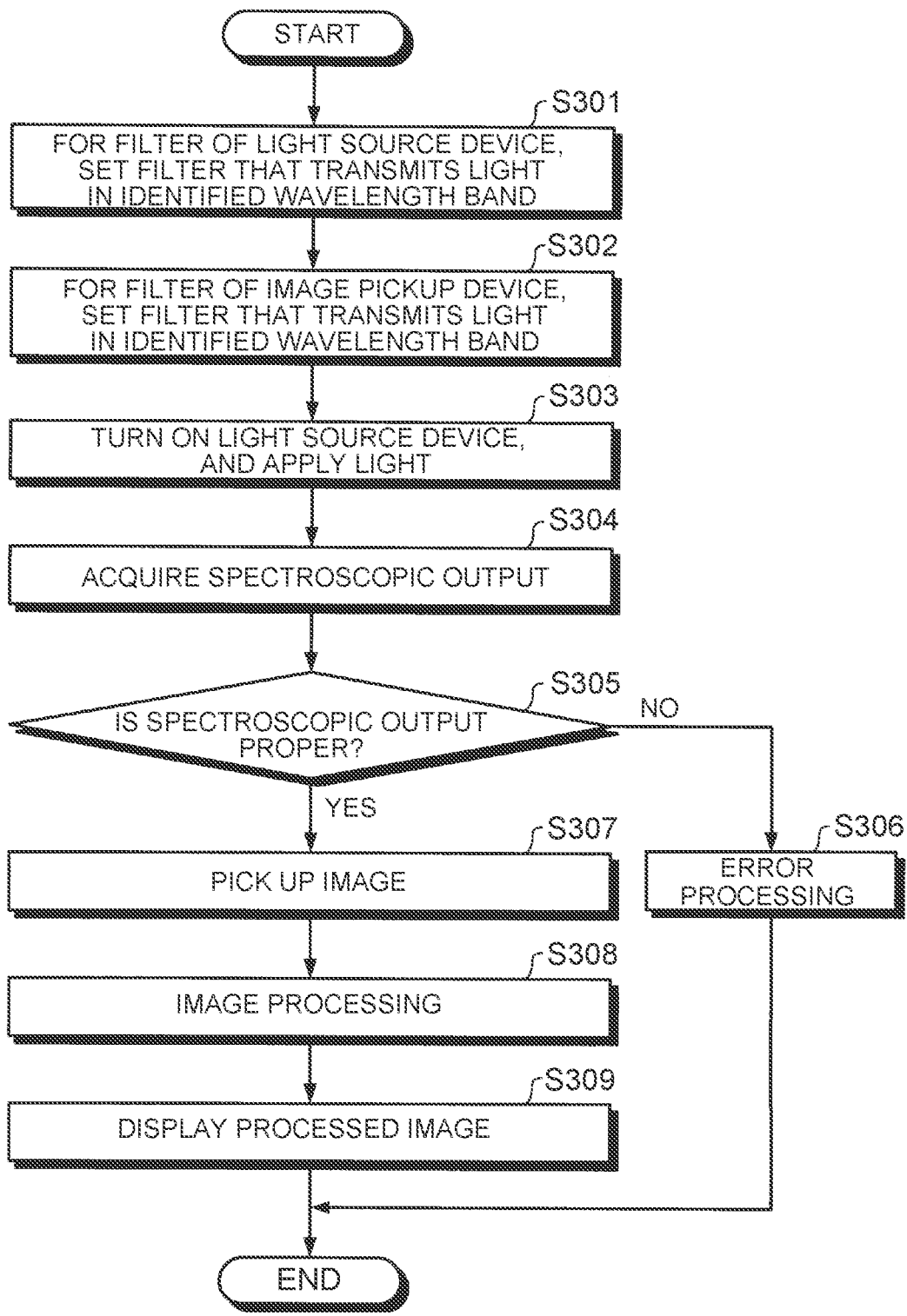
FIG. 9 is a flowchart showing a display control procedure by the physical body inspection device shown in FIG. 8.

Next, a display control procedure by the physical body inspection device 20 will be described. FIG. 9 is a flowchart showing the display control procedure by the physical body inspection device 20 shown in FIG. 8. As shown in FIG. 9, for the variable filter 24a of the light source device 24, the physical body inspection device 20 selects the filter that transmits the light in the wavelength band identified by the wavelength identification unit 16b and that does not transmit the light in the wavelength band other than the identified wavelength band (step S301).

Then, for the variable filter 23a of the image pickup device 23, the physical body inspection device 20 selects the filter that transmits the light in the wavelength band identified by the wavelength identification unit 16b and that does not transmit the light in the wavelength band other than the identified wavelength band (step S302). Thereafter, the physical body inspection device 20 turns on the white light source 14a of the light source device 14, and applies the light (step S303). The white light includes lights having various wavelengths. However, the filter 24a transmits lights in the specific wavelength band and does not transmit lights in the wavelength band other than the specific wavelength band, and the light transmitted by the filter 24a is applied to the physical body 50.

The physical body inspection device 20 acquires the spectroscopic output from the spectroscopic unit 13a, for confirming that the light applied to the physical body 50 satisfies the specific wavelength band and the intensity (step S304). Thereafter, the physical body inspection device 20 determines whether the measured spectroscopic output is proper. Specifically, in the case of the specific wavelength band, it is determined that the spectroscopic output is proper.

In the case where it is determined that the spectroscopic output is not proper (step S305; No), error processing is performed (step S306), and the process is ended. As the error processing, for example, on the display unit 11, characters such as "white light source error" may be displayed, or an error code may be displayed.

On the other hand, in the case where it is determined that the spectroscopic output is proper (step S305; Yes), the image of the physical body 50 placed on the inspection table 60 is picked up (step S307).

Then, the physical body inspection device 20 performs the image processing such as the noise removal, the differential processing, the luminance gradient calculation and the threshold processing (step S308), controls the display unit 11 such that the display unit 11 displays the processed image (step S309), and ends the process.

In this way, in the embodiment 2, the physical body inspection device 20 arranges the variable filters 23a, 24a constituted by a plurality of filters each of which transmits the light in a specific wavelength band and each of which does not transmits the light in the wavelength band other than the specific wavelength band, in the image pickup device 23 and the light source device 24, and selects the variable filters 23a, 24a with the control unit. Thereby, the light in the identified wavelength band is applied, and the light in the identified wavelength band is picked up by the image pickup unit 13b. Therefore, it is possible to efficiently reduce the influence of the environment light in the case where the inspection of the physical body is performed in the factory or the like.

Embodiment 3

In the above embodiments 1, 2, the case where the light in the identified wavelength band is applied to the whole surface of the inspection table 60. In an embodiment 3, a case where physical bodies 50 at specific places on the inspection table 60 are displayed using a plurality of spot white light sources and a plurality of variable filters will be described. The same sites as sites in the embodiments 1, 2 are denoted by the same reference characters, and detailed descriptions of the sites are omitted.

Outline of Physical Body Inspection System

Figure 10:
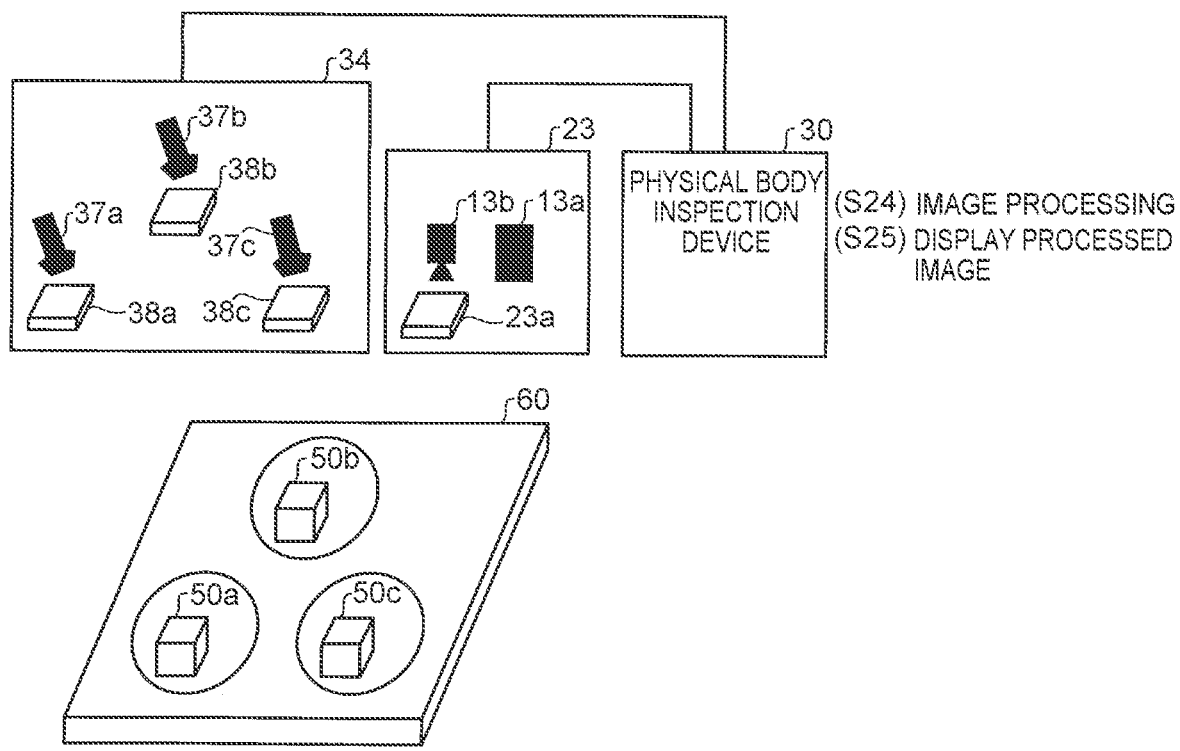
FIG. 10 is a diagram showing the outline of a physical body inspection system according to an embodiment 3.

Next, the outline of a physical body inspection system according to the embodiment 3 will be described. FIG. 10 is a diagram showing the outline of the physical body inspection system according to the embodiment 3. It is assumed that a physical body inspection device 30 has identified the wavelength band in which the intensity of the light is equal to or lower than the predetermined threshold at all times of day.

As shown in FIG. 10, the physical body inspection device 30 arranges spot white light sources 37a, 37b, 37c (collectively referred to as a "spot white light source 37" also, hereinafter), for locally applying light to physical bodies 50. Further, variable filters 38a, 38b, 38c (collectively referred to as a "variable filter 38" also, hereinafter) are arranged between the physical bodies 50 and the spot white light source 37. The variable filter 38 is constituted by a plurality of filters each of which transmits the light in a specific wavelength band and each of which does not transmit the light in the wavelength band other than the specific wavelength band. The spot white light source 37 is a white light source provided with a lens that focuses the application direction of light to a light application direction of the white light source 14a or a filter that focuses the application direction of light.

After the physical body inspection device 30 identifies the wavelength band in which the intensity of the light is equal to or lower than the predetermined threshold at all times of day, the physical body inspection device 30 selects a filter that transmit the light in the identified wavelength band and that does not transmit the light in the wavelength band other than the identified wavelength band, from the plurality of filters of the variable filter 38 (S21).

Thereafter, the physical body inspection device 30 applies the light that is of the light emitted by the spot white light source 37 of the light source device 34 and that is transmitted by the variable filter 38, to the physical body 50 (S22). With the image pickup unit 13b, the physical body inspection device 30 picks up the image of the light reflected from the physical body 50, through the variable filter 23a with the selected filter that transmits the light in the identified wavelength band and that does not transmit the light in the wavelength band other than the identified wavelength band (S23).

Then, the physical body inspection device 30 performs image processing to the image picked up by the image pickup unit 13b (S24). Specifically, differential processing is performed to the image in the X direction and the Y direction, and luminance gradients are evaluated. Then, the pixel values of pixels having luminance gradients less than a predetermined threshold are set to a predetermined value (for example, "0"), and thereby the luminance gradients of the pixels are eliminated. The display unit 11 is controlled so as to display the image after the image processing (S25).

Configuration of Physical Body Inspection Device 30

Figure 11:
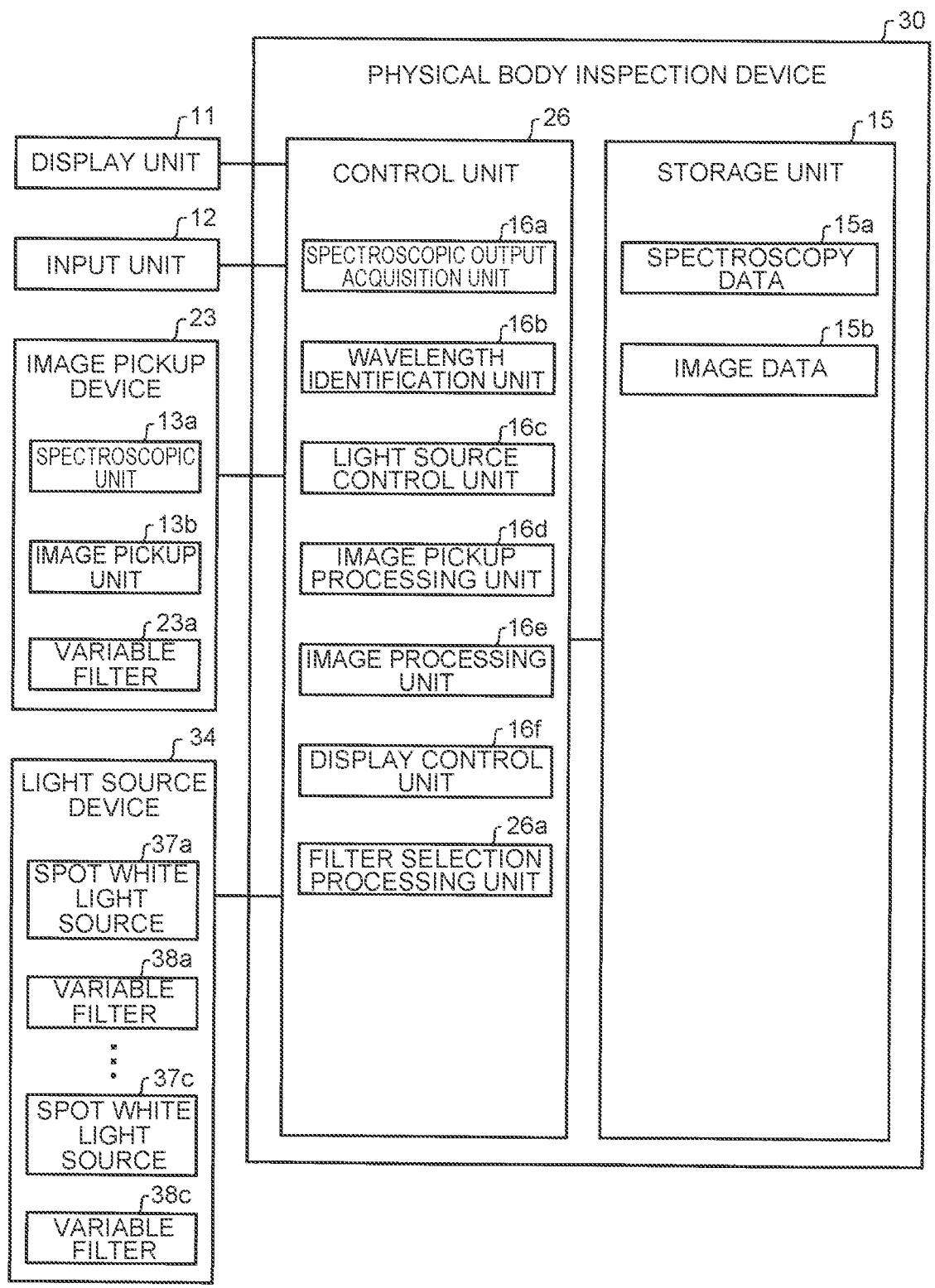
FIG. 11 is a functional block diagram showing the configuration of a physical body inspection device shown in FIG. 10.

Next, the configuration of the physical body inspection device 30 will be described. FIG. 11 is a functional block diagram showing the configuration of the physical body inspection device 30 shown in FIG. 10. As shown in FIG. 11, the physical body inspection device 30 includes the storage unit 15 and the control unit 26, and is connected with the display unit 11, the input unit 12, the image pickup device 23 and the light source device 34.

The light source device 34 includes the plurality of spot white light sources 37a, 37b, 37c and the plurality of variable filters 38a, 38b, 38c. The spot white light source 37 is a white light source in which the application region of light is limited by an optical lens or the like. Further, the variable filter 38 is the same filter as the variable filter 24a of the light source device 24 in the embodiment 2.

The processing procedure in the physical body inspection device 30 is the same as the processing procedure in the physical body inspection device 20, and therefore detailed descriptions are omitted.

In this way, in the embodiment 3, the physical body inspection device 30 arranges the plurality of spot white light sources 37, applies the light in the identified wavelength band to the physical bodies 50 locally placed on the inspection table 60, through the variable filters 38 arranged between the physical bodies 50 and the spot white light sources 37, and picks up the light in the identified wavelength band with the image pickup unit 13b. Therefore, it is possible to efficiently reduce the influence of the environment light in the case where the inspection of the physical body is performed in the factory or the like.

In the above embodiment 3, the case where the light source device 1 includes three spot white light sources 37 has been described, but the applicable embodiment is not limited to this. In the light source device 34, the application direction of the light may be focused to the light application direction, using one white light source, and a lens or filter capable of varying the application direction may be provided.

Each configuration illustrated in the above embodiments is a functional schematic configuration, and the illustrated configuration does not always need to be physically adopted. That is, the manner of separation and integration of the devices is not limited to the illustrated manner, and all or some of the devices can be configured to be functionally or physically separated or integrated in an arbitrary unit, depending on various loads and use situations.

The physical body inspection system and display control method according to the present disclosure are suitable for efficiently reducing the influence of environment light in the case where the inspection of a physical body is performed in a factory or the like.

What is claimed is:
1. A physical body inspection system comprising:
a light source configured to apply light in a predetermined wavelength band to a physical body, the physical body being an inspection object;
a spectroscope configured to pick up an image of the physical body; and
a display configured to display the picked-up image of the physical body; and a processor and memory programmed to perform the following:

performing measurements by using the spectroscope to measure an intensity for each wavelength band constituting an environment light at several times of day; and identifying the predetermined wavelength band as a band with a lowest intensity of all the measured intensities for the several times of day; and controlling the light source to apply the light in the predetermined wavelength band.

2. The physical body inspection system according to claim 1, wherein the light source includes a white light source configured to emit white light, and a first filter configured to transmit the light in the predetermined wavelength band in wavelength bands constituting the white light, the predetermined wavelength band being identified by the processor.

3. The physical body inspection system according to claim 2, wherein the spectroscope includes a second filter configured to transmit the light in the predetermined wavelength band in the wavelength bands constituting the white light, the predetermined wavelength band being identified by the processor.

4. The physical body inspection system according to claim 3, wherein:

each of the first filter and the second filter includes a plurality of optical filters each of which is configured to transmit light in a specific wavelength band; and the processor is configured to automatically select an optical filter configured to transmit the light in the identified predetermined wavelength band, from the plurality of optical filters.

5. The physical body inspection system according to claim 2, wherein the light source is configured to apply the light in the predetermined wavelength band to a predetermined region in a spotted manner, the light in the predetermined wavelength band being included in the light emitted from the white light source.

6. A display control method in a physical body inspection system including:

a spectroscope configured to pick up an image of a physical body, the physical body being an inspection object; and a display configured to display the image of the physical body that is picked up by the spectroscope, the display control method comprising:

performing measurements by using the spectroscope to measure an intensity for each wavelength band constituting an environment light at several times of day; and identifying a predetermined wavelength band as a band with a lowest intensity of all the measured intensities for the several times of day;

applying, by a light source, light in the predetermined wavelength band to the physical body; and picking up the image of the physical body by the spectroscope.

\* \* \* \* \*